(12) United States Patent
Edstrom, Sr.

(10) Patent No.: US 6,293,229 B1
(45) Date of Patent: Sep. 25, 2001

(54) CAGE FLOOD PREVENTION SYSTEM

(75) Inventor: William E. Edstrom, Sr., Waterford, WI (US)

(73) Assignee: Edstrom Industries, Inc., Waterford, WI (US)

( * ) Notice: Subject to any disclaimer, the term of this patent is extended or adjusted under 35 U.S.C. 154(b) by 0 days.

(21) Appl. No.: 09/552,176

(22) Filed: Apr. 18, 2000

(51) Int. Cl.$^7$ .............................. A01K 1/01; A01K 1/03
(52) U.S. Cl. .......................................... 119/482; 119/458
(58) Field of Search ..................... 119/419, 456, 119/458, 475, 482; 137/247.15, 513.3, 516.17

(56) References Cited

U.S. PATENT DOCUMENTS

| | | | |
|---|---|---|---|
| 2,653,569 | 9/1953 | Forester | 119/475 |
| 2,776,070 | * 1/1957 | Phillips | 137/516.17 |
| 3,228,418 | 1/1966 | Rosback et al. | 137/516.17 |
| 3,292,582 | * 12/1966 | Rubricius | 119/458 |
| 3,335,741 | 8/1967 | Liljendahl | 137/247.15 |
| 3,397,714 | * 8/1968 | Liljendahl | 137/247.15 |
| 3,403,696 | 10/1968 | Pynchon | 137/516.13 |
| 3,610,273 | 10/1971 | Russell | 137/513.3 |
| 4,699,088 | * 10/1987 | Murray et al. | 119/419 |
| 4,712,574 | 12/1987 | Perrott | 137/217 |
| 5,148,766 | 9/1992 | Coiro, Sr. et al. | 119/418 |
| 5,337,696 | 8/1994 | Edstrom et al. | 119/419 |
| 5,349,923 | 9/1994 | Sheaffer et al. | 119/475 |
| 5,823,144 | 10/1998 | Edstrom, Sr. et al. | 119/475 |
| 5,865,144 | 2/1999 | Semenuk | 119/419 |
| 5,954,013 | 9/1999 | Gabriel et al. | 119/456 |
| 5,996,535 | * 12/1999 | Semenuk et al. | 119/456 |
| 6,021,739 | * 2/2000 | Allen | 119/458 |

* cited by examiner

Primary Examiner—Charles T. Jordan
Assistant Examiner—Elizabeth Shaw
(74) Attorney, Agent, or Firm—Boyle Fredrickson Newholm Stein & Gratz S.C.

(57) ABSTRACT

A flood prevention system for a ventilated cage includes a self-sealing drain valve that opens automatically to prevent the cage from flooding if a water supply valve or water bottle leaks. A preferred drain valve is mounted in the floor of the cage and includes a perforated drain cup, a perforated seal cup, and a drain seal, all held together by a connector such as a rivet. The perforated drain cup extends above the bottom surface of the cage a small amount, and the perforated seal cup extends downwardly from the drain cup to present a valve seat. The drain seal preferably comprises a diaphragm of a resiliently flexible material which normally abuts the valve seat. However, if the water supply valve or water bottle leaks sufficiently for water to accumulate in the perforated drain cup, the weight of the accumulated liquid forces the drain seal away from the valve seat to permit the water to drain away from the cage. The drain seal thereafter returns to its original position to preserve atmospheric integrity within the cage. A protective structure, such as a partition or tray, may also be provided in the cage to provide a dry area serving as a safe habitat for animals housed within the cage if bedding in the remainder of the cage becomes saturated.

20 Claims, 5 Drawing Sheets

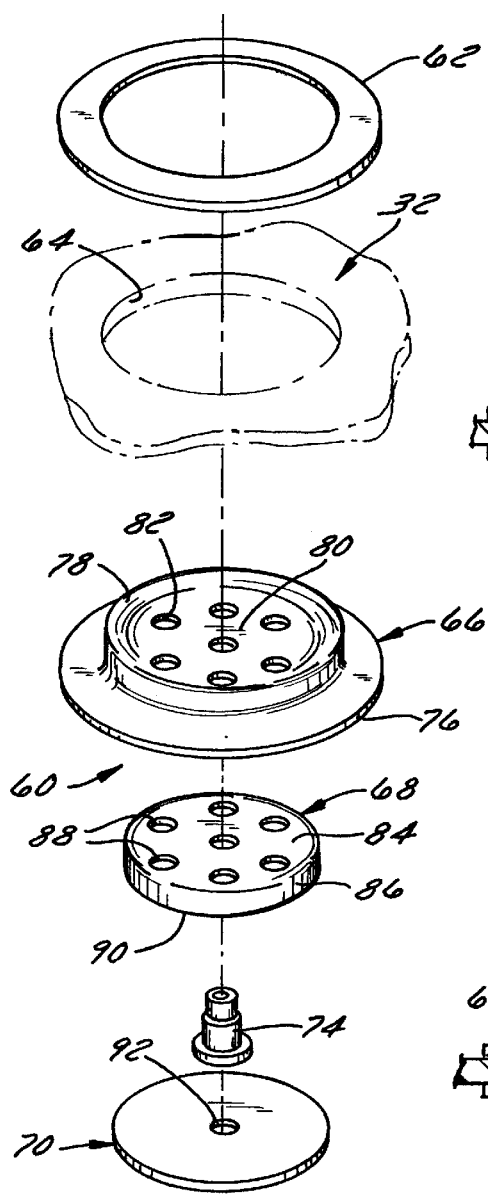
FIG. 4
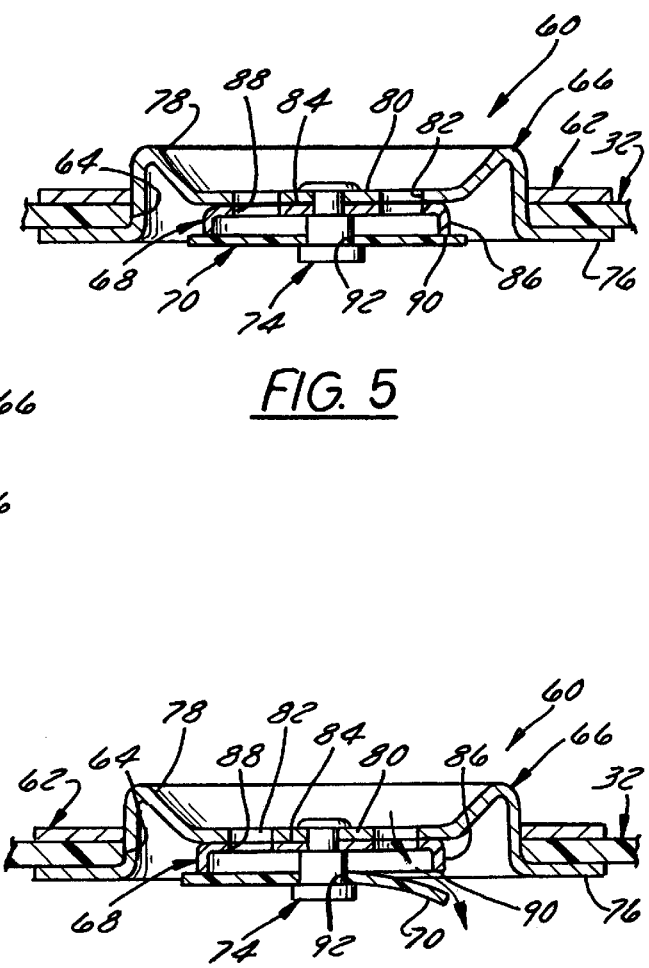
FIG. 5
FIG. 6

CAGE FLOOD PREVENTION SYSTEM

BACKGROUND OF THE INVENTION

1. Field of the Invention

The present invention relates to animal cages and, more particularly, relates to a flood prevention system for use in a ventilated small animal cage and to a cage having a flood prevention system.

2. Discussion of the Related Art

Ventilated cages are widely used in research facilities for housing lab animals such as mice and rats. The cages typically are provided in a cage and rack system in which a number of rows of cages are mounted on stacked shelves. In order to prevent the air in each cage from contaminating adjacent cages, all of the cages of the typical system of this type are ventilated using a common air supply duct that supplies air to the cages and a common exhaust manifold that draws air out of the cages, thereby leaving a slight positive pressure in the cages. The animals therefore remain isolated from one another to prevent the transfer of diseases. Systems of this general type are disclosed in U.S. Pat. Nos. 5,954,013; 5,349,923; and 5,148,766, all of which are assigned to Lab Products, Inc.

The cages may be supplied with drinking water either by individual water bottles or by a water supply manifold and a plurality of animal watering valves, one of which is accessible from each cage. When a water manifold and animal watering valves are employed to supply drinking water to the animal, each cage may be coupled to both the air supply duct and the water supply manifold by a common docking assembly that extends into the front wall of the cage.

Water supply valves and water bottles sometimes leak, potentially flooding the bottom of the cage and endangering the animals housed in the cage. If the cage is provided in a cage and rack system, the flooding danger extends to cages adjacent the cage with the leaking water bottle or watering valve. Prior known-cages lacked any measures to prevent cages from flooding and also lacked adequate measures to channel any water that leaked from a watering valve or bottle away from the cage. The need therefore has arisen to provide a drain for draining water from a leaking water supply valve or water bottle away from a cage, thereby preventing the cage from flooding. However, in order to minimize or prevent the air in the cage from contaminating the adjacent cage, an acceptable flood prevention system should not unnecessarily destroy the atmospheric integrity of the cage by allowing it to be contaminated with room air.

Even an adequate drain would not solve all problems associated with a leaking water bottle or watering valve. Most cages have wood chips or another water-absorbent bedding strewn about their floors. This bedding may become saturated if a water bottle or watering valve leaks and remain damp for a substantial period of time thereafter, even if all standing water were to be drained from or otherwise removed from the cage. Wood chips are particularly problematic because they act as wicks to draw water from the flooded portion of the cage to other portions that would otherwise remain dry. Damp bedding poses a substantial source of discomfort to animals housed in the cage and may pose hypothermia and other health risks to the animals. These risks are particularly high in ventilated cages because the animals may be chilled by airflow through them. The need therefore has arisen to provide a safe haven that remains dry even if the bedding in the cage becomes saturated from leaking or spilled water.

SUMMARY OF THE INVENTION

Pursuant to the invention, a method and an apparatus are provided for preventing a cage from flooding if water spills or leaks into the cage.

The apparatus comprises a self-sealing drain valve that is mounted in the floor of a ventilated cage that automatically opens to drain flood water from the cage and that otherwise is sealed to maintain atmospheric integrity within the cage. A preferred drain valve includes a perforated drain cup, a perforated seal cup, and a drain seal all held together by a connector such as a rivet. The perforated drain cup extends above the bottom surface of the cage a small amount so as to form a collector for water leaking into the cage, and the perforated drain seal extends downwardly from the drain cup to present a valve seat. The drain seal preferably comprises a resiliently flexible diaphragm which normally seals against the valve seat of the perforated drain seal. However, if the cage floods such that liquid accumulates in the perforated drain cup, the weight of the liquid forces the drain seal away from the valve seat on the perforated seal cup to permit the liquid to drain away from the cage.

The cage may also be provided with protective structures that provide a safe haven for an animal in the event of water bottle or water supply valve leakage. These structures are desirable because, even when the drain valve works properly, bedding within the cage may absorb a significant amount of liquid so that the cage remains damp even after the liquid drains out of the cage through the self-sealing drain valve.

For instance, a tray may be provided for the animal to climb into to avoid damp bedding within the cage. The tray may comprise a simple open-topped tray whose walls are sufficiently high to be above the level of the bedding in the cage but sufficiently low for the animals(s) in the cage to climb into. The animals can simply climb into the tray and stand in it if the bedding becomes wet, thereby providing the animals with the opportunity to remain dry until the cage can be cleaned. The tray preferably is made of metal or another structure that is too hard for animals to gnaw into.

In the alternative, a partition can be mounted or molded into the cage to separate the back end of the cage from the front end that contains the bedding. In a preferred embodiment, the partition is formed integrally with the cage and has a metal guard clipped over its upper edge to prevent the animal from gnawing into the partition.

These and other advantages and features of the invention will become apparent to those skilled in the art from the detailed description and the accompanying drawings. It should be understood, however, that the detailed description and the accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 4 is an exploded perspective view of the self-sealing drain valve structure illustrated in FIGS. 1–3;

FIG. 5 is a sectional elevation view taken generally along the line 5—5 of FIG. 2 and illustrating the drain valve in its closed position;

FIG. 6 corresponds to FIG. 5 and illustrates the drain valve in its open position;

DETAILED DESCRIPTION OF THE PREFERRED EMBODIMENTS

1. Resume

Pursuant to the invention, a flood prevention system for a ventilated cage includes a self-sealing drain valve that opens automatically to prevent the cage from flooding if a water supply valve or water bottle leaks. A preferred self-sealing drain valve is mounted in the floor of the cage and includes a perforated drain cup, a perforated seal cup, and a drain seal, all held together by a connector such as a rivet. The upper perforated drain cup extends above the bottom surface of the cage a small amount, and the perforated seal cup extends downwardly from the drain cup to present a valve seat. The drain seal preferably comprises a diaphragm of a resiliently flexible material which normally abuts the valve seat. However, if the water supply valve or water bottle leaks sufficiently for water to accumulate in the perforated drain cup, the weight of the accumulated liquid forces the drain seal away from the valve seat to permit the water to drain away from the cage. The drain seal thereafter returns to its original position to preserve atmospheric integrity within the cage. A protective structure, such as a partition or tray, may also be provided in the cage to provide a dry area serving as a safe habitat for animals housed within the cage if bedding in the remainder of the cage becomes saturated such as due to valve leakage.

2. System Overview

The self-sealing drain forming the preferred embodiment of the invention is particularly-well suited for use with ventilated cages because it maintains atmospheric integrity within the cages. While the system is described herein in connection with a cage and rack system for use in laboratory settings, it is equally applicable to cage and rack systems usable in other settings such as pet shops and even to settings such as homes in which ventilated cages are utilized individually.

Figure 1:
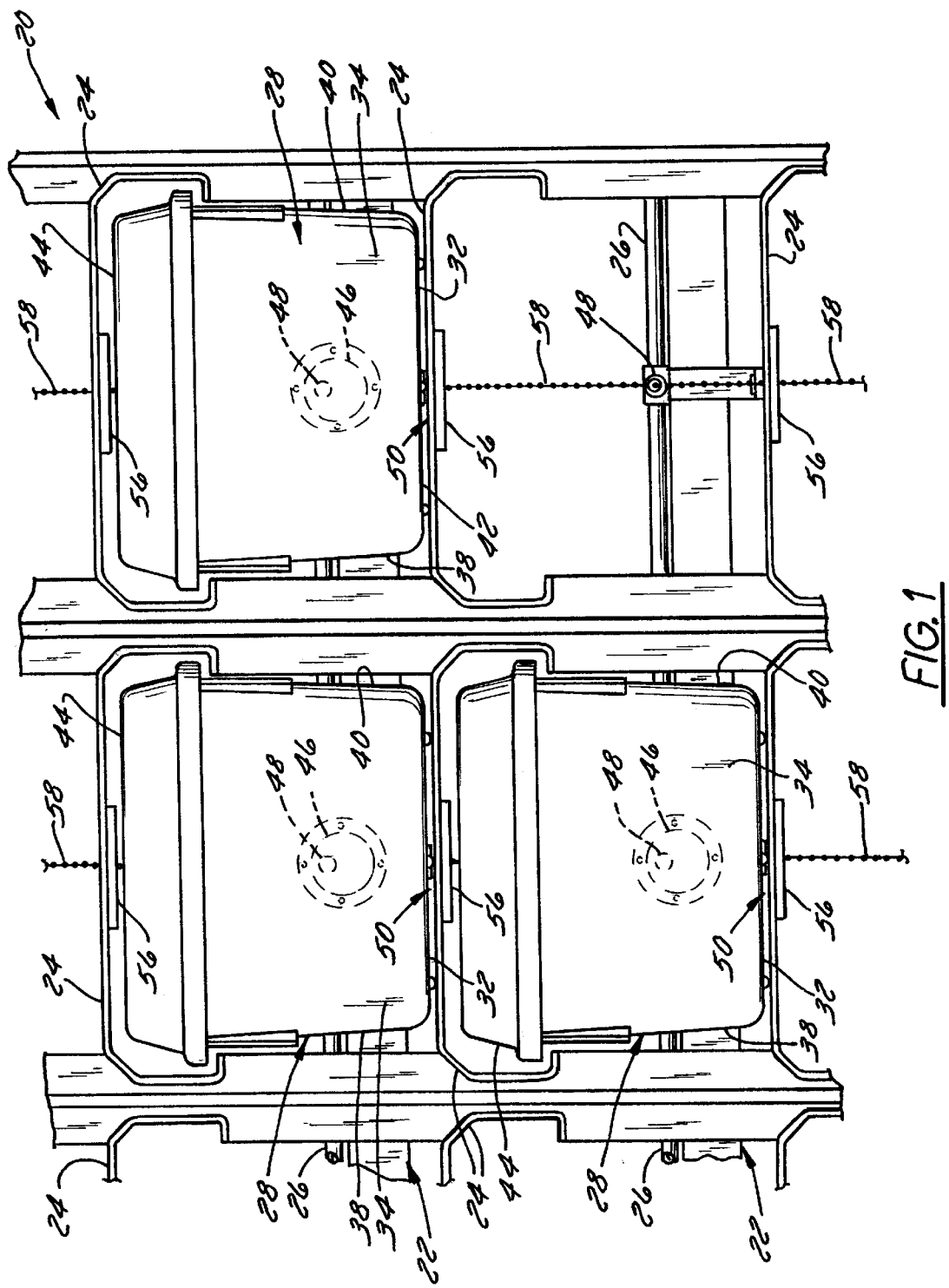
FIG. 1 is front elevation view of a cage and rack system having cages fitted with a flood prevention system constructed in accordance with a preferred embodiment of the present invention.
Figure 2:
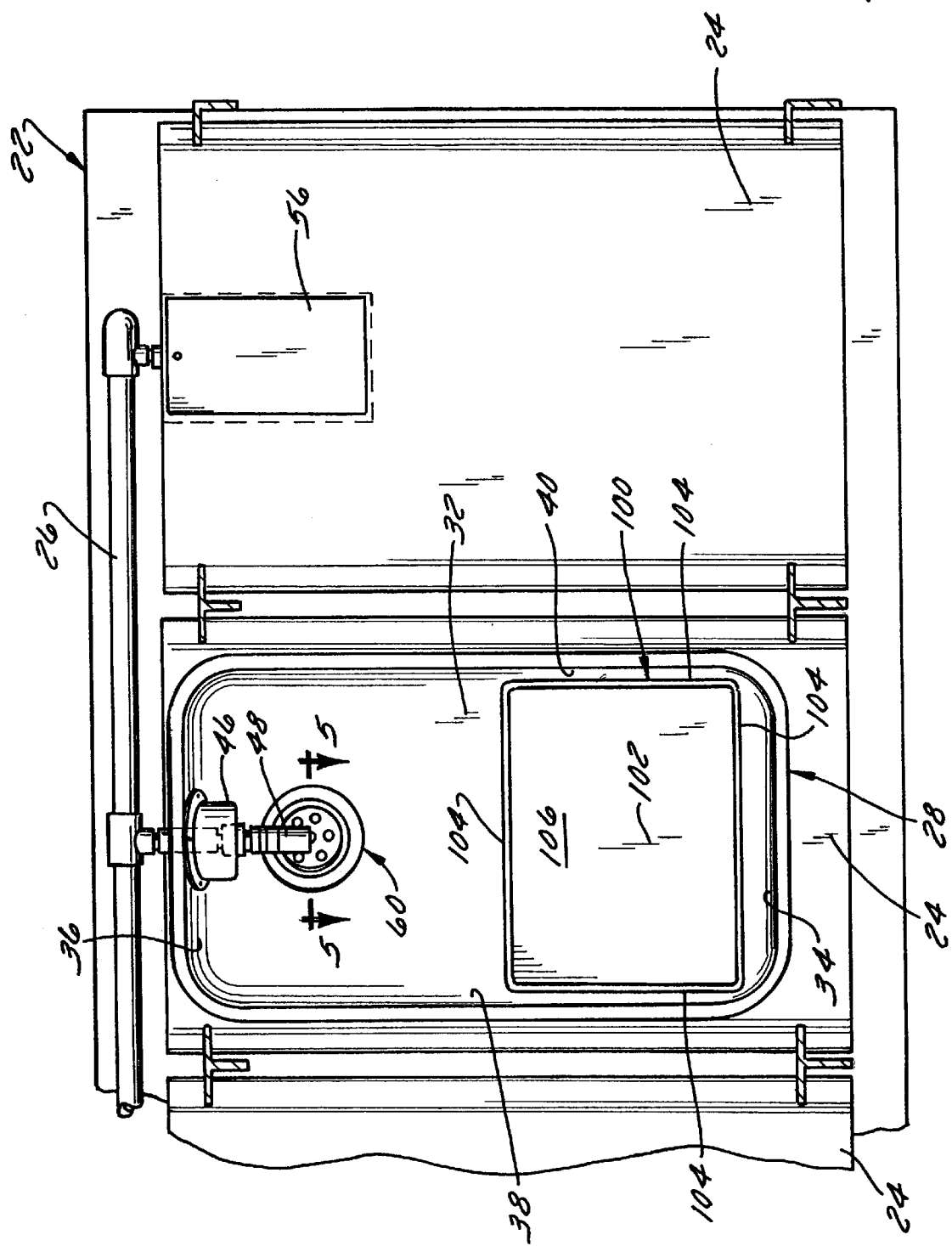
FIG. 2 is a top plan view of a portion of the cage and rack system of FIG. 1, illustrating the locations of a self-sealing drain valve, a watering valve, and a tray in ventilated cages of the system.
Figure 3:
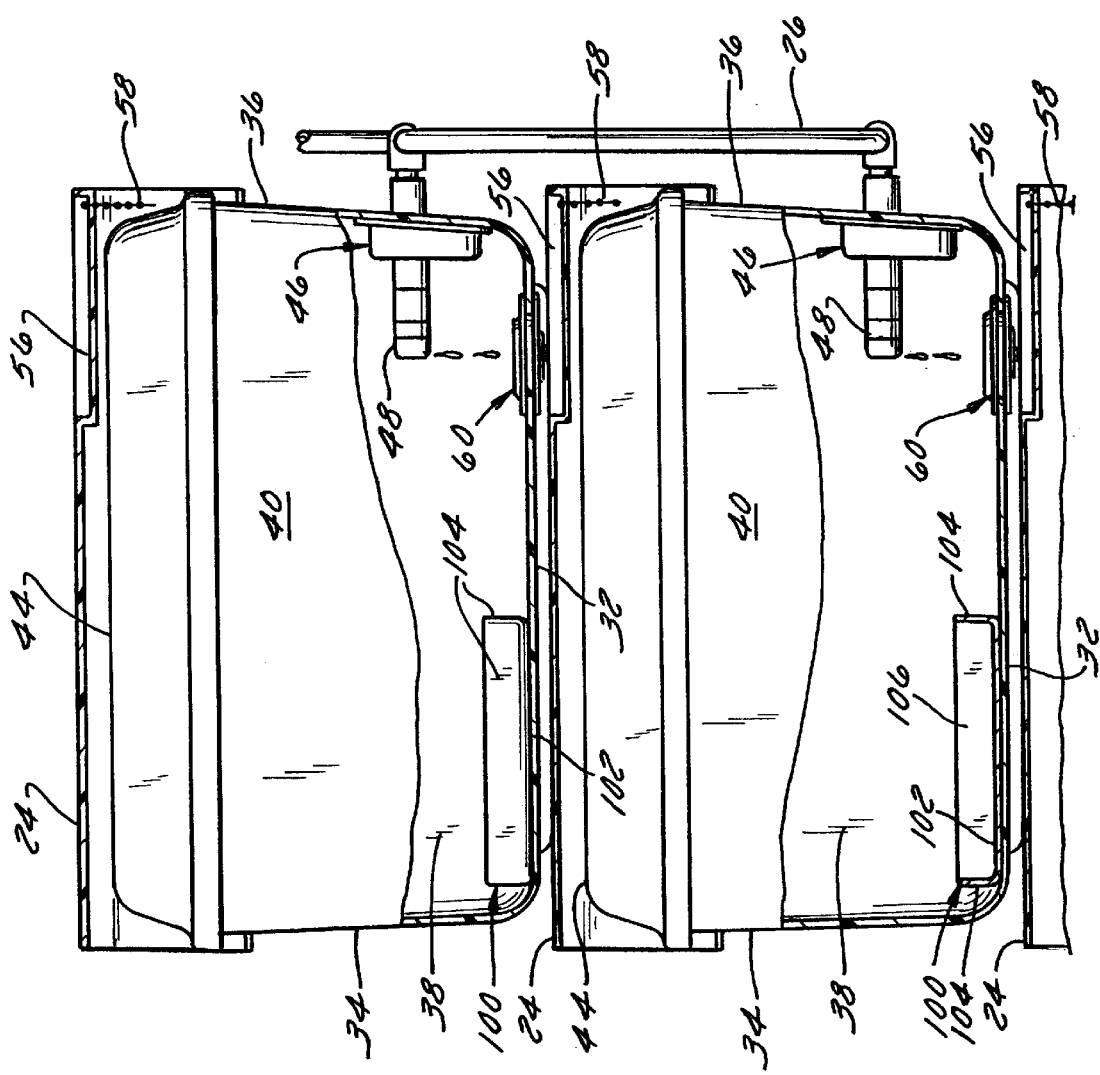
FIG. 3 is a side elevation view of a portion of the cage and rack systems of FIGS. 1 and 2, illustrating a leaking animal water supply valve.

Referring to FIGS. 1–3, a portion of a cage and rack system 20 is illustrated that employs ventilated cages fitted with a flood prevention system constructed in accordance with a first preferred embodiment of the invention. The cage and rack system 20 includes a rack 22 including vertically spaced shelves 24 and a plurality of cages 28 mounted on the shelves 24. If the cages 28 are supplied with water from a common source rather than individual water bottles, then a water supply manifold 26 may be mounted on the rack 22 and coupled to the individual cages via animal watering valves or water supply valves 48. Each water supply valve 48 preferably comprises an animal-actuated valve opened by the tongue or snout of an animal housed in the cage 28. Alternatively, each cage 28 could accommodate its own water bottle, in which case the water supply manifold would not be required.

Each cage 28 is configured to maintain atmospheric integrity within the cage so as to isolate the animals(s) housed therein from the adjacent cage(s). Each cage 28 includes an injection-molded plastic base having a floor 32, opposed front and rear walls 34, 36, and a pair of opposed sidewalls 38, 40 connecting the walls 34 and 36 to one another. The base of each cage 28 is capped with a removable lid such as a filter bonnet 44. The rear wall 36 of each cage 28 has an opening formed therein for accommodating a grommet 46 that serves as a docking mechanism for coupling the cage 28 to an air supply duct (not shown) and the water supply manifold 26 (if present) from which the associated animal water supply valve 48 extends.

A flood prevention system 50 is provided in each cage 28 for protecting animals housed within the cage from flood-related discomfort that could otherwise occur in the event of water supply valve leakage. The flood prevention system 50 includes a self-sealing drain valve 60 that drains flood water from the cage 28, and may additionally include a protective structure for providing a safe haven for animals in the cage if bedding within the cage becomes saturated with water. The drain valve 60 is configured to drain flood water through the floor 32 of the cage 28 and into a drain channel 56 which is mounted in or otherwise provided on the associated shelf 24 directly beneath the drain valve 60. Each drain channel 56 is recessed relative to the support surface of the associated shelf 24 and is sloped forwardly so as to direct water from the drain valve 60 to a guide structure that is located adjacent the front edge of the shelf 24. The outlets of at least some of drain channels 56 are aligned such that a single guide structure, such as a chain 58, can channel water away from a plurality of vertically-spaced cages via a common drain path. Typically, a single chain 58 will be operable to channel water from the drain channels 56 associated with all cages of a row extending the height of the cage and rack assembly 20.

A preferred self-sealing drain 60 and two possible protective structures 100 and 150 now will be detailed.

3. Self-Sealing Drain Valve

Referring to FIGS. 4–6, the self-sealing drain valve 60 may include any of a variety of structures that is normally sealed to preserve the atmospheric integrity within the associated ventilated cage 28 but which opens automatically to drain water from the cage 28 if water begins to accumulate on the drain valve. The drain valve 60 of the illustrated embodiment is inserted through a bore 64 located in the floor 32 of the cage 28 and then clamped and sealed to the floor 32. Valve 60 includes an annular ring clip 62, a perforated drain cup 66, a perforated seal cup 68, and a drain seal 70, all centrally interconnected together by a connector such as a rivet 74.

The drain cup 66 includes an annular ring portion 76, a tubular body portion 78, and perforated portion 80, all formed from a single metal-stamping. The outer ring portion 76 is configured to surround the bore 64 and to abut the bottom surface of the cage floor 32. The body portion 78 extends upwardly through the bore 64 from the inner peripheral edge of the ring portion 76. The perforated portion 80 is recessed relative to the upper end of the body portion 78 and has perforations 82 formed therein for the passage of water. The center of the portion 80 preferably is positioned under the outlet of the water supply valve 48 (or water bottle if a water bottle is utilized instead of a water supply valve) to form a collector for water leaking from the valve 48 to accumulate, thereby inhibiting the flow of flood water to the remainder of the cage 28. The ring clip 62 is designed to clip over the body portion 78 to clamp the drain cup 66 against the floor 32 as best seen in FIGS. 5 and 6.

The seal cup 68 has a disk portion 84 and a seal portion 86 which extends downwardly from the outer radial edge of the disk portion 84. Perforations 88 in the disk portion 84 are configured to register with the perforations 82 in the drain cup 66 when the drain valve 60 is assembled. The bottom axial edge of the seal portion 86 forms a seat 90 for the drains seal 70.

The drain seal 70 is made of a resiliently flexible material, such as silicone rubber, which deflects under the weight of water thereon. The drain seal 70 comprises a flat disk having a central aperture 92 which slips over the heat of the rivet 74. The drain seal 70 normally seats against the valve seat 90 on the seal cup 68 as seen in FIG. 5. However, the drain seal 70 is sufficiently flexible that, if water accumulates in the collector of the drain cup 66, the weight of the water on the drain seal 70 causes the drain seal to deflect away from the valve seat 90 on the seal cup 68 to permit the water to drain from the cage 28 and into the reservoir 56 as seen in FIG. 6. The drain seal 70 preferably is sufficiently flexible to unseat before enough water has accumulated in the drain cup 66 to overflow it and is sufficiently resilient to return to its initial position of FIG. 5 after the water has drained from the cage 28.

4. Construction and Operation of First Embodiment of Safe Haven Structure

Referring again to FIGS. 1–3, one possible structure for providing a safe haven for animals to avoid contact with damp bedding in the cage 28 comprises a simple tray 100 that provides a dry area into which the animal may climb if the bedding in the cage 28 is damp. The tray 100, which is formed from a corrosion and bite resistant material such as stamped stainless steel, has a floor 102 and a plurality of sidewalls 104 which enclose an interior 106. The interior 106 should have a sufficiently large area to comfortably accommodate the animals(s) housed in the cage 28. The sidewalls 104 should be sufficiently high to be above the level of the bedding in the cage 28 but sufficiently low for the animal(s) in the cage to climb over. If the cage is configured to house mice, the sidewalls should have a height of about 1"–2." The tray 100 forming this embodiment is advantageous because it is easily retrofitable to existing cage designs and because it can be easily removed to permit cleaning of it and/or the cage.

5. Construction and Operation of Second Embodiment of Safe Haven Structure

Figure 7:
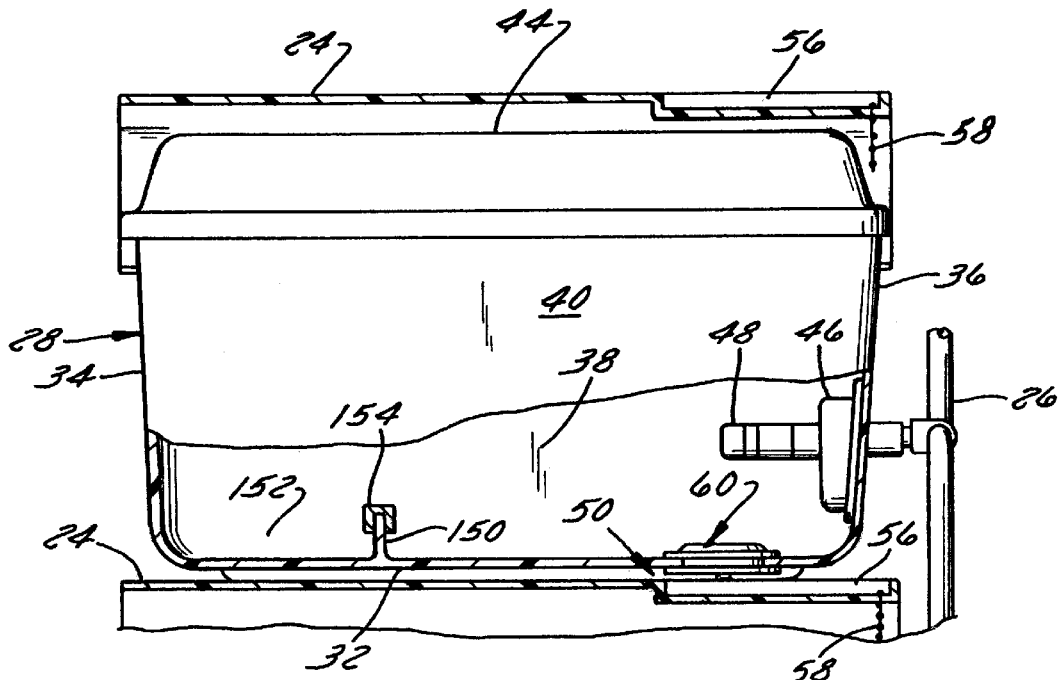
FIG. 7 is a side elevation view of a portion of a cage and rack system having ventilated cages which include a flood prevention system constructed in accordance with a second embodiment of the invention.
Figure 8:
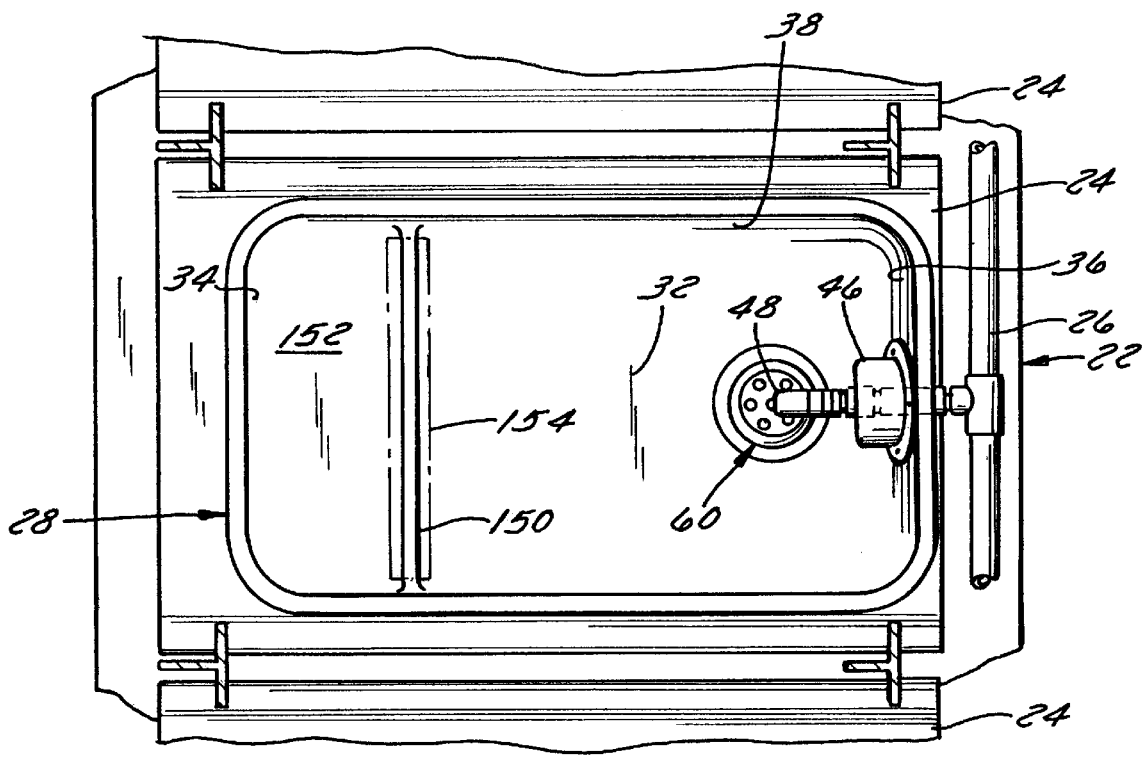
FIG. 8 is a top plan view of one of the cages of FIG. 7.

Referring now to FIGS. 7 and 8, another possible structure for providing a safe haven for animals to avoid contact with damp bedding in the cage 28 comprises a simple partition 150 that extends laterally across the bottom of the cage 28 between the sidewalls 38 and 40 at a location behind the drain valve 60. An area 152 is formed behind the partition that is free of bedding that may become saturated if the water supply valve 48 leaks. The partition 150 may snap into grooves in the sidewalls 38 and 40 and/or in the floor 32 or may be molded integrally with the remainder of the cage 28. Its height, like the height of the tray 100 discussed in connection with the first embodiment, should be sufficiently high to be above the level of the bedding in the cage 28 but sufficiently low for the animal(s) in the cage to climb over. If the partition 150 is molded with the cage 28 or formed by another material that could be damaged if it is gnawed on by animal(s) in the cage, a protector such as a U-shaped metal guard 154 can be clipped over or otherwise attached to the upper end of the partition 150. The partition 150 forming this embodiment is advantageous because it can be formed integrally with the cage 28 and is less expensive to fabricate than a separate tray.

While the present invention has been described and illustrated in connection with preferred embodiments, the scope thereof is not to be limited by such description and illustration but is to be limited solely by the scope of the claims, which follow. Certain equivalents will also appear to those skilled in the art, all of which are deemed to be within the scope of the present invention.

I claim:

1. A ventilated cage comprising:
   (A) a base having a floor and a plurality of sidewalls extending upwardly from said floor;
   (B) a lid mounted on said base so as to preserve atmospheric integrity within the cage; and
   (C) a self-sealing drain valve mounted in said floor of said cage, said drain valve including a member that is movable, under the weight of water thereon, (1) from a closed position in which said member abuts against a seat to maintain atmospheric integrity in said cage (2) to an open position in which said member moves away from said seat to permit water to drain from said cage.

2. A cage as recited in claim 1, wherein said drain valve further comprises a perforated drain cup which includes an annular body portion that extends through said floor of said cage and which is clamped onto said floor, said drain cup forming a collector for accumulating water leaking into said cage.

3. A cage as recited in claim 2, wherein said drain cup further comprises (1) an annular ring portion which extends radially outwardly from a bottom end portion of said annular body portion and which abuts a bottom surface of said floor of said cage and (2) a perforated disk portion which is recessed relative to an upper end of said body portion and which forms a base of said collector.

4. A cage as recited in claim 1, wherein said drain valve includes a perforated seal cup which presents said seat and a resiliently flexible drain seal which forms said member and which is attached to said seal cup at a radially central portion thereof.

5. A cage as recited in claim 4, wherein said drain seal comprises a diaphragm which seats against said valve seat when said drain seal is in said closed position.

6. A cage as recited in claim 5, wherein said diaphragm is made of flexible silicone rubber.

7. A cage as recited in claim 1, herein said self-sealing drain valve is located in a front central portion of said floor.

8. A cage as recited in claim 1, further comprising a protective structure which is disposed on said floor and which is configured to provide a dry habitat via which animals housed within said cage may avoid damp bedding in said cage.

9. A cage as recited in claim 8, wherein said protective structure comprises a partition which extends laterally across said cage at a location behind said drain valve, said partition being sufficiently low to permit animals housed in said cage to climb over it.

10. A cage as recited in claim 9, wherein said partition is molded to said floor of said cage.

11. A cage as recited in claim 8, wherein said protective structure comprises a tray having a floor, sidewalls, and an interior.

12. A cage and rack assembly comprising:
(A) a rack having a plurality of vertically-spaced shelves;
(B) a plurality of ventilated cages mounted on said shelves, each of said cages including
   (1) a base having a floor and a plurality of sidewalls extending upwardly from said floor,
   (2) a lid mounted on said base so as to preserve atmospheric integrity within said cage, and
   (3) a self-sealing drain valve mounted in said floor, said drain valve including a drain seal which is movable, under the weight of water thereon, (1) from a closed position in which said drain seal abuts against a seat to maintain atmospheric integrity in said cage (2) to an open position in which said drain seal moves away from said seat to permit water to drain from said cage.

13. A cage and rack assembly as recited in claim 12, wherein each of said drain valves further comprises a perforated drain cup and a perforated seal cup which are centrally connected to one another and to said drain seal by a rivet.

14. A cage and rack assembly as recited in claim 12, further comprising a plurality of drain channels, each of which is located beneath a drain valve of a respective cage, said drain channels being recessed with respect to a support surface of an associated shelf and being configured to channel water to an edge of said shelf.

15. A cage and rack assembly as recited in claim 14, wherein a plurality of said drain channels have outlets that are aligned with one another in a common flow path, and further comprising a water guide which extends through said flow path and which drains water away from said shelves.

16. A cage and rack assembly as recited in claim 15, wherein said water guide comprises a chain.

17. A method for preventing a cage from flooding, said method comprising the steps of:
(A) providing a cage;
(B) creating a positive pressure within said cage relative to atmosphere by ventilating said cage; and
(C) draining water from said cage through a self-sealing drain valve which is disposed in a floor of the cage, which opens automatically under weight of the water thereon, and which thereafter closes automatically.

18. A method as recital claim 17, wherein said drain valve includes an annular flange, a perforated drain cup, a perforated seal cup, and a resilient flexible drain seal, all centrally interconnected together by a connector, and wherein the draining step comprises allowing water to drain away from said drain valve by deflecting said flexible drain seal under weight of the water, and wherein said flexible drain seal automatically returns to an initial position thereof to reseal against said seal cup after said cage is drained.

19. A method as recited in claim 17, further comprising providing a structure in said cage which permits an animal to climb therepast to provide safe habitat during cage flooding.

20. A method as recited in claim 17, further comprising channeling water away from a plurality of vertically-spaced cages via a common drain path.

* * * * *